(12) United States Patent
Freed et al.

(10) Patent No.: US 11,930,734 B2
(45) Date of Patent: *Mar. 19, 2024

(54) ADJUSTABLE FERTILIZER APPLICATION IMPLEMENT

(71) Applicant: Ag Focus, LLC, Lexington, IL (US)

(72) Inventors: Bruce W. Freed, Lexington, IL (US); Brian E. Freed, Lexington, IL (US)

(73) Assignee: AG FOCUS LLC, Lexington, IL (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/238,880

(22) Filed: Apr. 23, 2021

(65) Prior Publication Data

US 2021/0235615 A1    Aug. 5, 2021

Related U.S. Application Data

(62) Division of application No. 16/102,419, filed on Aug. 13, 2018, now Pat. No. 10,986,774.

(60) Provisional application No. 62/675,310, filed on May 23, 2018.

(51) Int. Cl.
*A01C 23/02* (2006.01)
*A01C 5/06* (2006.01)

(52) U.S. Cl.
CPC .............. *A01C 23/02* (2013.01); *A01C 5/064* (2013.01); *A01C 5/068* (2013.01)

(58) Field of Classification Search
CPC ......... A01C 23/02; A01C 5/064; A01C 5/068; A01C 23/00; A01C 5/062; A01C 5/06; A01C 5/00; A01C 5/066
See application file for complete search history.

(56) References Cited

U.S. PATENT DOCUMENTS

| | | | | |
|---|---|---|---|---|
| 4,538,532 A * | 9/1985 | Coker | ................... | A01C 23/025 172/166 |
| 4,628,840 A * | 12/1986 | Jacobson | ............. | A01C 23/025 172/558 |
| 11,406,055 B2 * | 8/2022 | Freed | ................... | A01C 21/007 |
| 2011/0282556 A1 * | 11/2011 | Klenz | ..................... | A01C 7/203 701/50 |
| 2015/0373898 A1 * | 12/2015 | Audigie | ................. | A01C 7/046 111/184 |

(Continued)

*Primary Examiner* — Christopher J. Novosad
(74) *Attorney, Agent, or Firm* — William H. Honaker; Dickinson Wright PLLC

(57) ABSTRACT

An agricultural implement for applying fertilizer beneath the surface of the soil. The implement has a main frame for connecting the agricultural implement to agricultural equipment. A swing arm is pivotally connected to the main frame. An adjustable actuator interconnects the swing arm to the main frame to control the movement of the swing arm with respect to the main frame. A pair of discs are mounted to the free end of the swing arm for rotation with respect to the swing arm. The discs are offset mounted with respect to one another and are angled outwardly with respect to the direction of travel of the implement. The discs form grooves for receipt of fertilizer. Fertilizer tubes are mounted adjacent the discs and terminate behind the discs with respect to the direction of travel. The fertilizer tubes deposit fertilizer in the grooves formed by the discs. A furrow closer is attached to the main frame to close the groove opened by the discs.

8 Claims, 5 Drawing Sheets

(56) References Cited

U.S. PATENT DOCUMENTS

2016/0100520 A1\* 4/2016 Bassett ................ A01B 29/06
172/27

\* cited by examiner

US 11,930,734 B2

ADJUSTABLE FERTILIZER APPLICATION IMPLEMENT

RELATED APPLICATIONS

This application is a division of U.S. patent application Ser. No. 16/102,419 filed on Aug. 13, 2018, which claims benefit to U.S. Provisional Application No. 62/675,310 filed on May 23, 2018, which are incorporated herein by reference in their entirety.

STATEMENT REGARDING FEDERALLY SPONSORED RESEARCH

NONE.

TECHNICAL FIELD

This invention relates generally to agricultural equipment and more specifically to a fertilizer application implement for applying fertilizer below the soil surface.

BACKGROUND OF THE INVENTION

As is well known, application of fertilizer to plants is critical to their healthy growth. Proper nutrition is essential for satisfactory crop growth and production. Fertilizer placement is an integral part of efficient crop management. "Correct placement often improves the efficiency by which plants take up nutrients and consequently encourages maximum yields of intensively managed agronomic crops. Correct fertilizer placement is especially critical for maximum crop yields under reduced tillage operations." (See University of Idaho College of Agriculture article by Robert L. Mahlar.)

Banding refers to placing nutrients below, above, on one side, or on both sides of the seed or seedlings at planting. In banding operations, a disc creates a furrow in the soil and a tube positioned in the furrow applies nutrients. After the crop is planted a subsurface banding treatment is called a side dress application.

Typically, fertilizer bands should be placed at least 2 inches away from the seed to prevent salt damage and ammonia toxicity. The more precise the application the better for plant health and growth. The problem is that soil conditions are not uniform due to for example weather, location and general conditioning. This makes accurate placement of fertilizer difficult because furrow forming discs are statically mounted; they cannot be adjusted during the fertilizer operation. The discs are preset and only move as a result of ground surface variations, not soil conditions. In other words, the depth of penetration of the furrow forming discs is not adjustable on the fly, resulting in varied depths and poor plant health and growth.

What is needed is a fertilizer application implement that can be adjusted to accommodate proper fertilizer placement depth in varying soil conditions. The present invention solves the above problems.

SUMMARY OF THE INVENTION

The present invention discloses an agricultural implement for applying fertilizer beneath the surface of the soil. The implement has a main frame for connecting the agricultural implement to agricultural equipment. A swing arm is pivotally connected to the main frame. An adjustable actuator interconnects the swing arm to the main frame to control the movement of the swing arm with respect to the main frame. The actuator can be adjusted for varying soil conditions or elevations, etc. The actuator can be adjusted from the cab of the agricultural equipment or at the implement.

A pair of discs are mounted to the free end of the swing arm for rotation with respect to the swing arm. The discs are offset mounted with respect to one another and are angled outwardly with respect to the direction of travel of the implement. The discs form grooves for receipt of fertilizer. Fertilizer tubes are mounted adjacent the discs and terminate behind the discs with respect to the direction of travel. The fertilizer tubes deposit fertilizer in the grooves formed by the discs. A furrow closer can be attached to the main frame to close the groove opened by the discs.

The disc of the preferred embodiment is concave and angled outwardly to squeeze the soil together to create a groove with a firm wall. The discs are offset to facilitate the flow of residue and prevent pinch points.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Generally shown in the figures is the fertilizer application implement 10 of the present invention. The fertilizer application implement 10 has a main frame 12 for connecting the system to agricultural equipment such as for example a seed planter.

Figure 1:
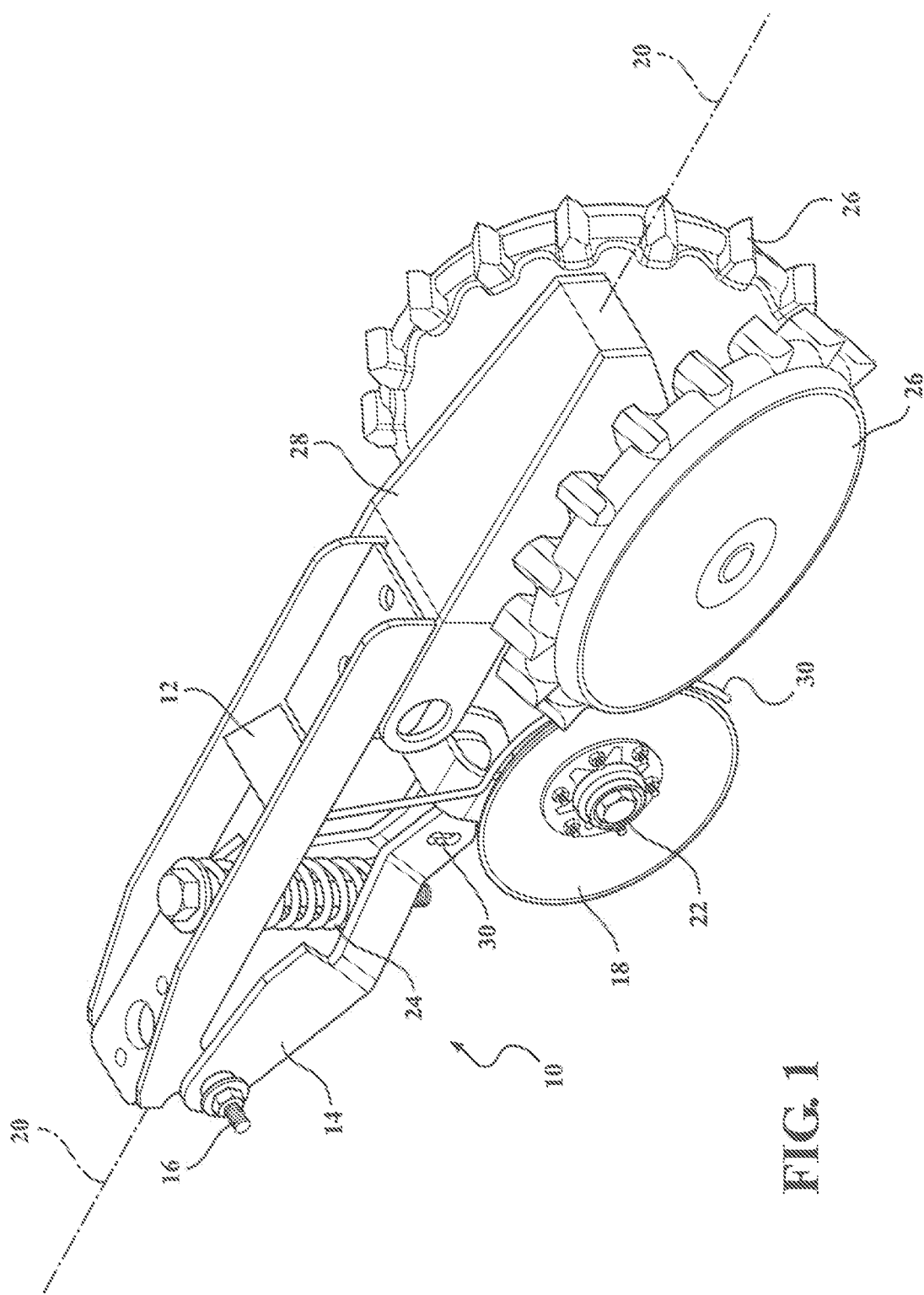
FIG. 1 is a perspective view of the adjustable fertilizer application implement of the present invention.
Figure 2:
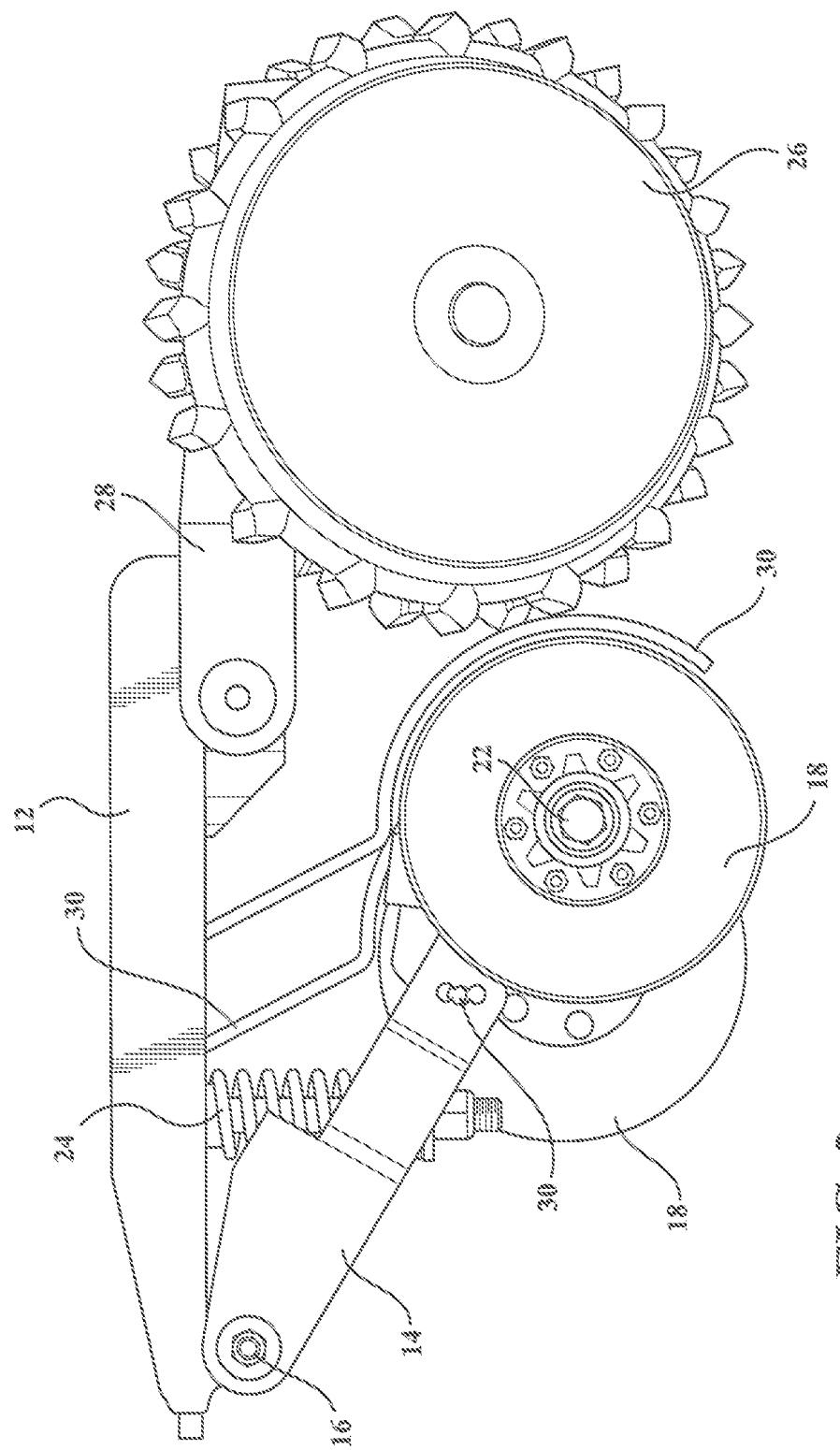
FIG. 2 is a top view of the adjustable fertilizer application implement of the present invention.
Figure 3:
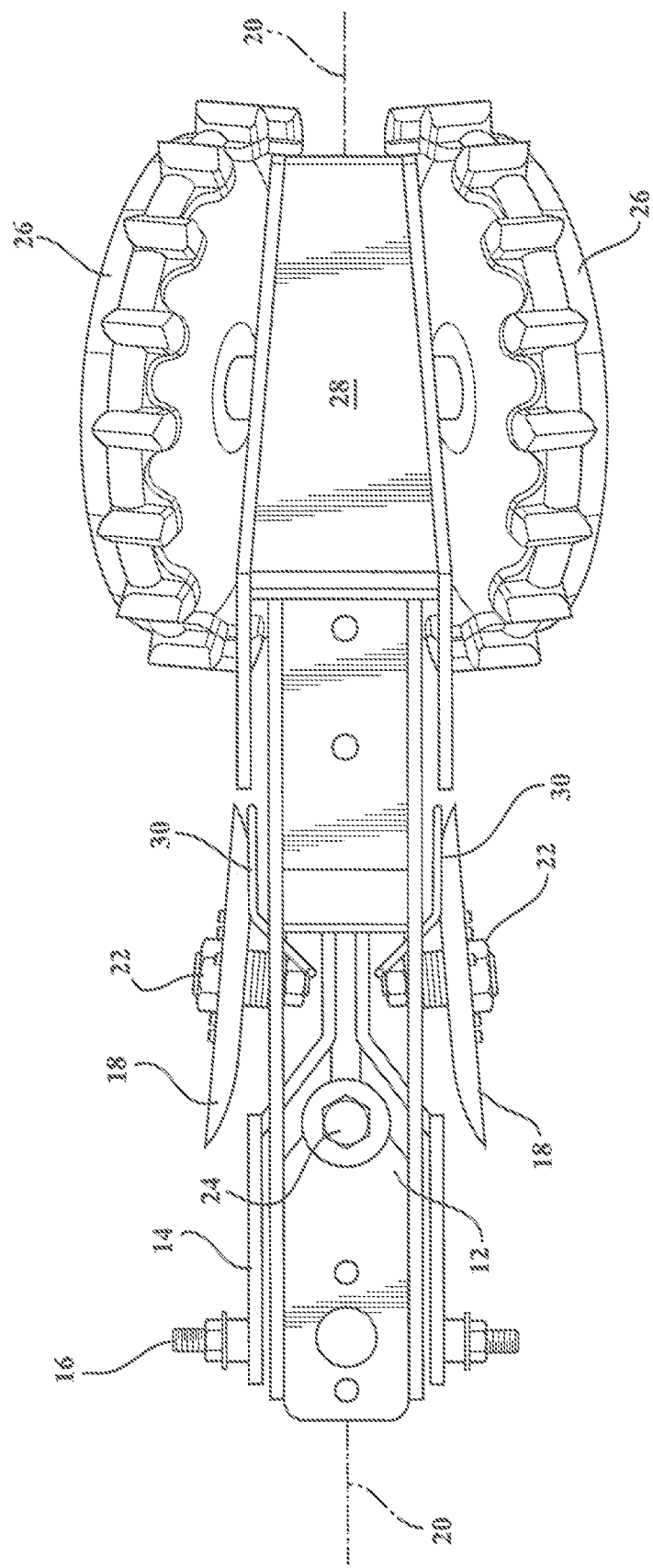
FIG. 3 is a side view of the adjustable fertilizer application implement of the present invention.
Figure 4:
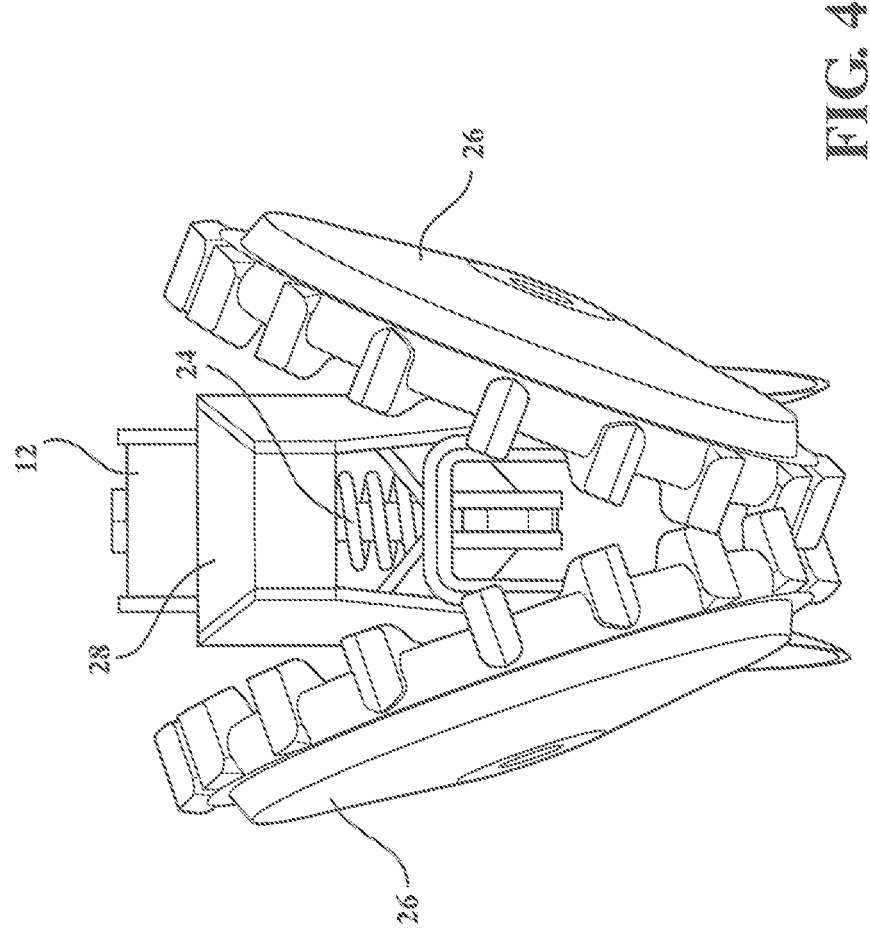
FIG. 4 is a top view of the adjustable fertilizer application implement of the present invention.
Figure 5:
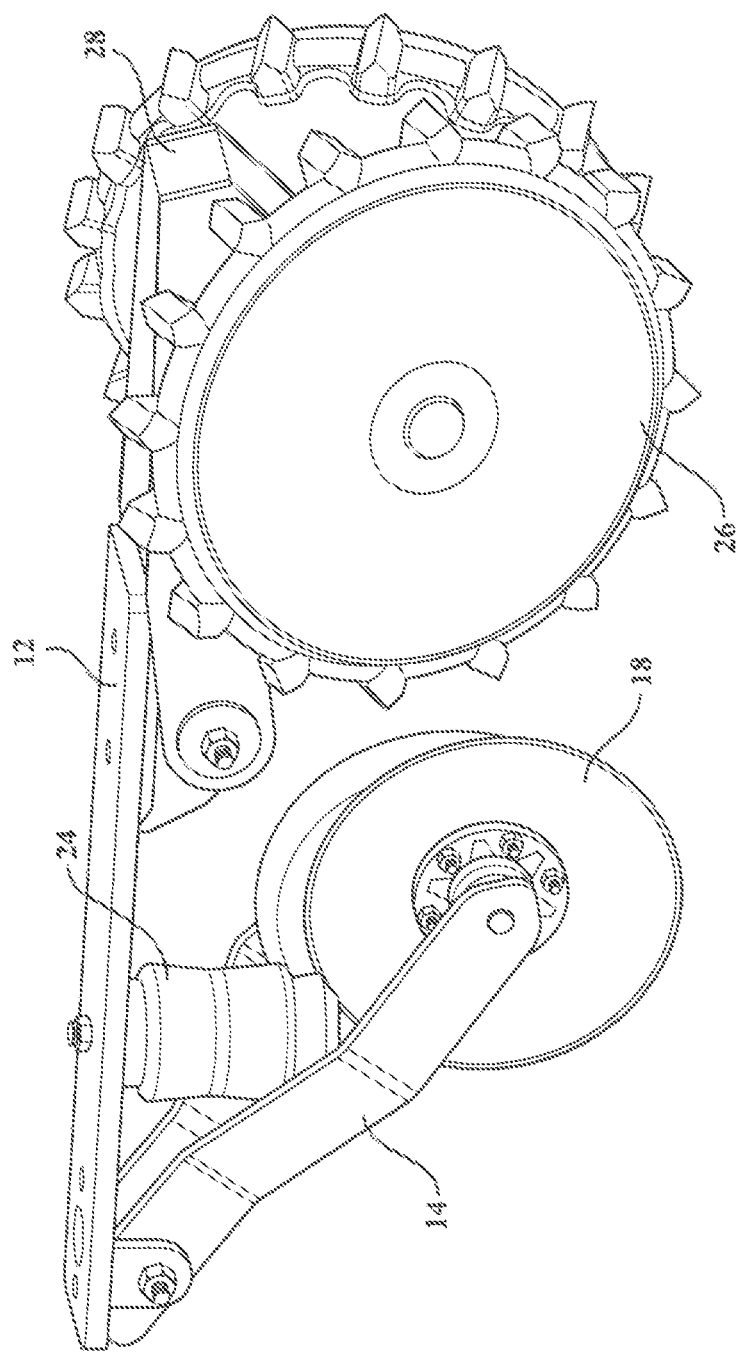
FIG. 5 is a perspective view of the adjustable fertilizer application implement of the present invention illustrating the remote control of the actuator.

Pivotally connected to the main frame 12 is a swing arm 14. A pivot 16 connects the swing arm 14 to the frame 12. Mounted at the free end of the swing arm 14 are discs 18. Discs 18 rotate about an axle 22. As illustrated, the discs 18 are each concave and offset in a direction parallel with the centerline 20. In addition, the discs 18 angle outwardly in the direction of travel with respect to the centerline 20, see FIG. 3.

An actuator 24 connects the swing arm 14 to the frame 12. The actuator 24 can be spring biased, hydraulic, electric, pneumatic, etc. The actuator 24 allows the position of the swing arm and thereby the discs 18 to be adjusted for a particular depth of penetration.

The actuator 24 can be remotely operated to allow for adjustment of the actuator 24 for changing soil conditions. A remote control unit 25 is schematically shown in FIG. 6. The remote control unit 25 is operatively connected to the actuator for controlling the actuator from the cab of the agricultural equipment, for example. In the disclosed embodiment, the actuator 24 is illustrated as a pneumatic actuator, but could be any type of actuator, for example hydraulic or electric. Slot 30 has a pin to allow limited movement of the disc 18 with respect to the swing arm 14.

The disc 18 is concave to squeeze the soil together and create the fertilizer groove. Discs 18 are offset or stacked to facilitate the flow of residue and prevent pinch points. The actuator 24 controls the depth of the discs and can be adjusted for different soil conditions to improve the application of fertilizer.

In the figures, the fertilizer tubes 30 are illustrated. The tubes 30 are mounted to the swing arm 14 and positioned behind the discs 18. As will be appreciated by those of ordinary skill in the art, the tubes are connected to a supply of fertilizer.

As shown in the drawings, a furrow closer 26 is attached to tailpiece 28. The tailpiece 28 is pivotally attached to the frame 12. Those of ordinary skill in the art will understand that the furrow closer illustrated is optional. Other closing wheels could be used if desired. An example of a furrow closer is disclosed in detail in U.S. patent application Ser. No. 15/968,640 filed on May 1, 2018 and assigned to the assignee of the present invention. U.S. patent application Ser. No. 15/968,640 is incorporated herein by reference.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An agricultural implement for applying fertilizer comprising:
   a main frame for connecting said agricultural implement to agricultural equipment for traveling in a direction of travel, said main frame having a centerline;
   a swing arm pivotally connected to said main frame, said swing arm having a free end;
   an adjustable actuator interconnecting said swing arm to said main frame to control the movement of said swing arm with respect to said main frame;
   at least one disc mounted to said free end of said swing arm for rotation with respect to said swing arm; said at least one disc is angled outwardly with respect to said direction of travel of said agricultural implement; said at least one disc forming a groove for the receipt of fertilizer;
   at least one fertilizer tube mounted adjacent said at least one disc, said at least one fertilizer tube terminating behind said at least one disc with respect to said direction of travel, said at least one fertilizer tube being adapted for depositing fertilizer in a groove formed by said at least one disc;
   a furrow closer attached to said main frame to close a groove opened by said at least one disc;
   whereby said at least one disc is angled outwardly to squeeze soil together to create a groove with a wall.

2. The agricultural implement of claim 1, wherein said adjustable actuator controls said at least one disc, said adjustable actuator can be adjusted for different soil conditions.

3. The agricultural implement of claim 1, further including a remote control operatively connected to said actuator, wherein said actuator is controlled remotely to adjust said adjustable actuator for changing soil conditions.

4. The agricultural implement of claim 1, further including a tailpiece pivotally attached to said main frame.

5. The agricultural implement of claim 4, wherein said furrow closer is mounted upon said tailpiece for rotation with respect to said tailpiece.

6. The agricultural implement of claim 4, further including at least a pair of furrow closers mounted upon said tailpiece for rotation with respect to said tailpiece.

7. The agricultural implement of claim 6, wherein said pair of furrow closers are angled inwardly with respect to said tailpiece.

8. The agricultural implement of claim 1, wherein said at least one disc has a concave face.

\* \* \* \* \*